United States Patent

Stache et al.

[15] 3,674,779
[45] July 4, 1972

[54] 4-CHLORO-3-OXO-14-HYDROXY-OR 4-CHLORO-3,14-DIHYDROXY-CARDA-4,20-DIENOLIDES AND PROCESS FOR THEIR MANUFACTURE

[72] Inventors: Ulrich Stache, Hofheim/Taunus; Kurt Radscheit, Kelkheim/Taunus; Werner Fritsch, Neuenhain/Taunus; Werner Haede, Hofheim/Taunus; Ernst Lindner, Frankfurt/Main, all of Germany

[73] Assignee: Farbwerke Hoechst Aktiengesellschaft vormals Meister Lucius & Bruning, Frankfurt/Main, Germany

[22] Filed: May 8, 1970

[21] Appl. No.: 35,895

[30] Foreign Application Priority Data

May 14, 1969 Germany..................P 19 24 801.2

[52] U.S. Cl..........................................260/239.57, 260/999
[51] Int. Cl..........................................C07c 173/02

[58] Field of Search............................260/239.57; /Machine Searched Steroids

[56] References Cited

UNITED STATES PATENTS 3,325,484   6/1967   Deghenghi..................260/239.55

Primary Examiner—Henry A. French
Attorney—Curtis, Morris & Safford

[57] ABSTRACT

Process for the manufacture of 4-chloro-3-oxo-14β-hydroxy- or 4-chloro-3,14β-dihydroxy-carda-4,20(22)dienolides wherein 3-oxo-carda-4,14,20(22)-trienolides are at first treated with chlorine, the compounds obtained are converted by hydrogenolysis into 3-oxo-4-chloro-carda-4,14,20-trienolides, these are treated with N-bromo-acid amides, and the 3-oxo-4-chloro-14β-hydroxy-15α-bromo-carda-4,20(22)-dienolides thus obtained are treated with Raney nickel and may be reduced.

4 Claims, No Drawings

4-CHLORO-3-OXO-14-HYDROXY-OR 4-CHLORO-3,14-DIHYDROXY-CARDA-4,20-DIENOLIDES AND PROCESS FOR THEIR MANUFACTURE

The present invention provides 4-chloro-3-oxo-14β-hydroxy- or 4-chloro-3,14β-dihydroxy-carda-4,20(22)-dienolides which may contain further hydroxyl, lower acyloxy, alkyl, acyl, acetal or ketal groups in 1-, 2-, 6-, 7-, 11-, 12-, 16-, 17-, and/or 19-positions.

The present invention also provides a process for the manufacture of the above-specified compounds, wherein correspondingly substituted 3-oxo-carda-4,14,20(20)-trienolides are at first treated in the presence of an organic base with chlorine or with agents that produce chlorine to obtain the corresponding 3-oxo-4,14,15-trichloro-carda-4,20(22)-dienolides, these are converted by hydrogenolysis into 3-oxo-4-chloro-carda-4,14,20(22)-trienolides, these are treated with N-bromo acid-amides, the 3-oxo-4-chloro-14β-hydroxy-15α-bromo-carda-4,20(22)-dienolides obtained are treated with Raney nickel and, in order to obtain 3-hydroxy compounds, the 3-oxo-chloro-14β-hydroxy-carda-4,20(22)-dienolides thus obtained may be reduced.

The process according to the invention proceeds, for example if 3-oxo-carda-4,14,20(22)-trienolide is used as the starting substance, according to the following reaction scheme:

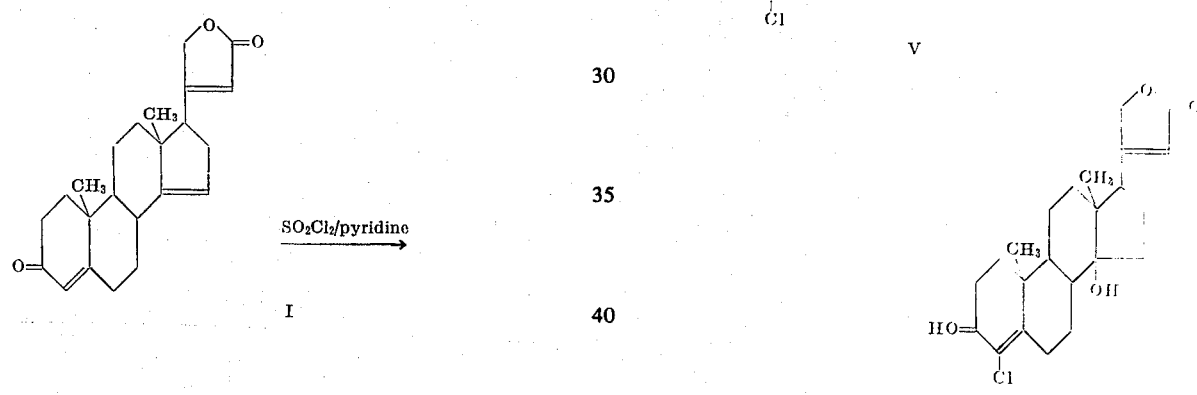

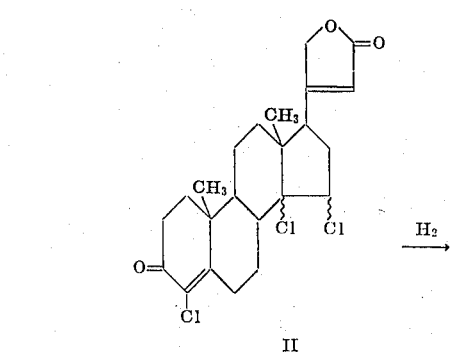

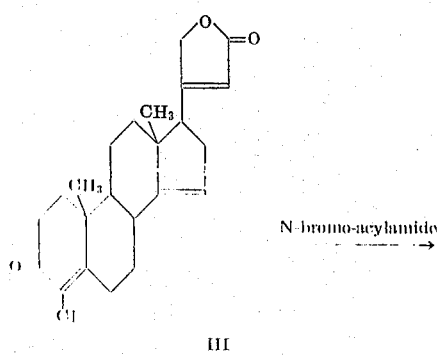

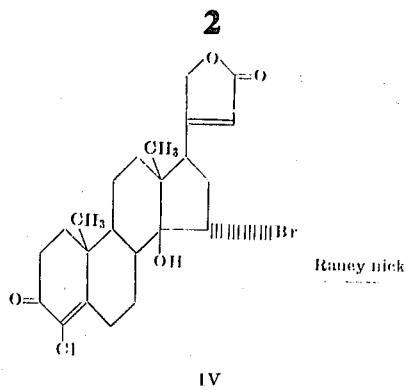

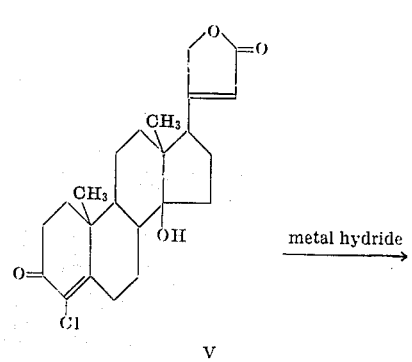

If the starting substances contain keto- or aldehyde-groups in 1-, 2-, 6-, 7-, 11-, 12-, 16-, 17-, and/or 19-positions these may be reduced to hydroxyl groups during reduction with metal hydride complexes, if they are not protected by suitable protective groups, for example ketal or acetal groups. The steroid compounds used as starting substances may be prepared, for example according to the process described in Belgian Pat. No. 695,311.

The process of the invention can be explained as follows: in the first reaction stage, i.e. the chlorination in the presence of an organic base, chlorine is added onto the $\Delta^{4(5)}$-double bond of the 3-oxo-$\Delta^4$-cardenolides, usually further chlorine atoms are simultaneously added onto the $\Delta^{14(15)}$-double bond. From the 4,5-dichloro compound formed intermediarily, the $\Delta^{4(5)}$-double bond is regenerated spontaneously, under separation of hydrogen chloride and chlorine substitution in the 4-position. The formation of the double bond occurs under the influence of the adjacent 3-keto group standing in conjugation to the 4(5)-position, while the chlorine atoms in the 14- and 15-positions are not eliminated, neither partially nor completely.

It is surprising that in this reaction chlorine is not likewise added onto the $\Delta^{20(22)}$-double bond of the butenolide ring or substituted in the 22-position, although it had to be expected that the $\Delta^{20(22)}$-double bond would be polarized in a similar manner by the adjacent 23-oxo function as the $\Delta^{4(5)}$-double bond by the 3-oxo function.

For carrying out the process of the invention, pyridine, picoline, N-dimethylaniline, quinoline, collidine or lutidine is preferably used as an organic base. An inert solvent, for example methylene chloride, chloroform, benzene, toluene, tetrahydrofurane, dioxane, dimethylformamide, may be added. The chlorination is effected either with elementary chlorine or with an agent that produces chlorine under the reaction conditions, for example sulfuryl chloride, which, if desired or required, may be dissolved in one of the above-mentioned inert solvents. The reaction conditions may vary within wide limits. In general, the operation is carried out at a temperature in the range of from 0° to 60 °C, preferably at room temperature, with 1–15 equivalents, preferably 2–8 equivalents, of sulfuryl chloride. Upon working up, the corresponding 3-oxo-4,14,15-trichloro-carda-4,20(22)-dienolides are obtained.

For preparing the 3-oxo-4-chloro-14β-hydroxy-carda-4,20(22)-dienolides, the 3-oxo-4,14,15-trichloro-carda-4,20(22)-dienolides of the type of compound II are first treated with active hydrogen, whereby both chlorine atoms in the 14- and 15-positions are eliminated by reduction under restoration of the $\Delta^{14}$-double bond. For this purpose, for example zinc in glacial acid is used, or the operation is carried out with Raney nickel charged with hydrogen in an inert solvent, for example methylene chloride, chloroform, tetrahydrofurane or dioxane, at temperatures in the range of from about 0° C to 50° C, preferably at room temperature.

The 3-oxo-4-chloro-carda-4,14,20(22)-trienolides of the type of compound III are subsequently converted by reaction with a N-bromo-acid amide in a weakly acid solution, for example in the presence of acetic acid, in an inert solvent, for example ether, dioxane, tetrahydrofurane, methylene chloride, chloroform or diglyme, into the 3-oxo-4-chloro-14β-hydroxy-15α-bromo-carda-4,20(22)-dienolides of the type of formula IV. As N-bromo-acid amides, there may be used bromo-acyl amides such as N-bromo-acetamide or N-bromo-succinimide or N-bromo-sulfonamides, preferably those of aromatic sulfonic acids, for example N,N-di-bromo-benzenesulfonamide.

The crude bromo-hydrins thus formed need no further purification and are treated directly with a Raney nickel catalyst in an alcohol, for example methanol or ethanol, at a temperature in the range of from 0° to 30° C. For this treatment, it is of advantage to remove any excess alkali adhering to the catalyst (and arising from its preparation) by subjecting the catalyst to several short digestions with water and then rinsing it with alcohol, prior to use, in order also to remove the major part of the water. Furthermore, it is recommended to saturate the Raney nickel with hydrogen before using it, in order to increase its activity. In this process, surprisingly only the bromine in the 15-position is removed by reduction, but not the vinylogous chlorine atom in 4-position.

The 3-oxo-4-chloro-14β-hydroxy-carda-4,20(22)-dienolides of the type of compound V are then subjected to the reduction with metal hydride complexes. This operation is preferably carried out with lithium-aluminum-tri-tert. butoxy hydride in a suitable solvent, for example an ether such as tetrahydrofurane, preferably at temperatures of about 0° C, or with lithium- or sodium boron hydride in solvents, for example alcohol or dioxane, to which water may have been added, preferably at room temperature.

The 4-chloro-3,14β-dihydroxy-carda-4,20(22)-dienolides thus obtained are novel cardio-active genines and are distinguished in particular by a strong positive inotropic and cardiovascular action. Owing to their substitution with chlorine in the 4-position, the products of the invention have an essentially greater stability to acids than the corresponding $\Delta^{4(5)}$-cardenolides which are not substituted by chlorine in the 4-position. Therefore, the products of the invention are particularly suitable as drugs in the treatment of diseases of the heart and of the circulation.

The following Example illustrates the invention. In the infrared spectra, only the characteristic bands have been indicated.

EXAMPLE
4-Chloro-3,14β-Dihydroxy-Carda-4,22(22)-dienolide (=4-Chloro-Canarigenin)

a. 3-oxo-4,14,15-trichloro-carda-4,20(22)-dienolide(II)

A solution of 3 ml of sulfuryl chloride in 12 ml of absolute benzene was added dropwise, at 0° C, while stirring, to a solution of 3 g of 3-oxo-carda-4,14,20(22)-trienolide in 75 ml of absolute methylene chloride and 75 ml of absolute pyridine. After stirring for 1 hour at 20° C, the reaction mixture was stirred into an aqueous solution of sodium bicarbonate, extracted with chloroform, the extracts were washed with water, dried and the solvent was removed by distillation. 2.5 g of residue were obtained (ultraviolet spectrum) $\lambda_{max.1} = 250$ mµ ($\epsilon = 16,100$), $\lambda_{max.2} = 212$ mµ ($\epsilon = 14,500$) which was digested with a small amount of acetone at 0° C and yielded, after several recrystallizations from a mixture of acetone and ether, 1.7 g of crude 3-oxo-4,14,15-trichloro-carda-4,20(22)-dienolide that was found to melt at about 223° C with decomposition.

Bands in the infrared spectrum: 1,775, 1,730–1,750 (wide), 1,680, 1,630, 1,580, 805, 690, 660, 640, 570 cm$^{-1}$.

b. 3-oxo-4-chloro-carda-4,14,20(22)-trienolide

A solution of 2.1 g of 3-oxo-4,14,15-trichloro-carda-4,20(22)-dienolide in 60 ml of pure methylene chloride was added, while stirring, to a suspension of about 50 g of Raney nickel that had been pretreated in the manner described hereunder, in 35 ml of pure methylene chloride. After stirring for 3 1/2 hours at 20° C, the catalyst was removed by filtration and the filtrate was evaporated to dryness. The residue was triturated with ether and yielded after filtration 1.65 g of 3-oxo-4-chloro-carda-4,14,20(22)-trienolide. After recrystallization from a mixture of methylene chloride and ether, the melting point was 258°–259° C.

Bands in the infrared spectrum: 1,780, 1,740, 1,675, 1,625, 1,575, 805, 690, 605, 570 cm$^{-1}$.

Ultraviolet spectrum:

$$\lambda_{max.1} = 253 \text{ m}\mu \text{ } (\epsilon = 12,600),$$

$$\lambda_{max.2} = 216 \text{ m}\mu \text{ } (\epsilon = 15,220).$$

Preparation of the Raney Nickel Catalyst 75 g of water moist Raney nickel were whirled for some seconds with each of three 760 ml portions of water and the supernatant water was decanted. The same procedure was repeated subsequently with each of three 100 ml portions of methanol. In this manner, 95 g of a methanol wet Raney nickel magma were obtained having a volume of about 55 ml, corresponding to a quantity of about 40 g of dry Raney nickel.

This suspension was flushed with 300 ml of methanol into a stirring vessel which had been placed under an atmosphere of nitrogen. Then, hydrogen was passed through for 1 ½ hours, while stirring well. Stirring was then discontinued, the reaction vessel was rinsed with nitrogen, the supernatant methanol was siphoned off and, after addition of 75 ml of pure methylene chloride, the whole were again stirred for some seconds. After having siphoned off the supernatant methylene chloride, the catalyst was ready for early use.

c. 3-Oxo-4-chloro-14β-hydroxy-carda-4,20(22)-dienolide(V)

1.08 ml of glacial acetic acid was added, at 0° C, to a solution of 1.5 g of 3-oxo-4-chloro-carda-4,14,20(22)-trienolide(III) in 10 ml of methylene chloride, 48 ml of dioxane and 9 ml of water. Then, 1.36 g of N,N-dibromo-benzene-sulfonamide was introduced into the well stirred mixture. After stirring for 1 hour while cooling with ice, the mixture was poured into water containing an excess of sodium bisulfate. The whole was extracted with about 120 ml of methylene chloride, the extract was washed with water and dried over sodium sulfate. This solution (about 120 ml) which contained the 15,14-bromohydrin, was added to a Raney nickel suspension prepared in the manner described above and containing about 45 g of Raney nickel, and the mixture was stirred for 3½ hours at about 20° C. The catalyst was then removed by filtration, the filtrate was concentrated to dryness and the residue was recrystallized from a mixture of acetone and ether. The crystallized product (980 mg) was chromatographed on a column of silica gel (height 25 cm, diameter 3 cm) and eluted successively with 300 ml of benzene, 700 ml of chloroform and 500 ml of a mixture of chloroform and methanol (99:1). From the last fraction, there were obtained after removal of the eluting agent by distillation, 690 mg of 3-oxo-4-chloro-14 β-hydroxy-carda-4,20(22)-dienolide which, after recrystallization, had a melting point of 220°–221° C.
Bands in the infrared spectrum: 3,515, 1,770, 1,740, 1,670, 1,615 (wide), 1,570, 800, 560 cm$^{-1}$.

d. 4-Chloro-3β,14β-dihydroxy-carda-4,20(22)-dienolide(VI) (=4-chloro-canarigenin)

1.51 g of lithium-aluminum-tri-tert.butoxy hydride in 11 ml of absolute tetrahydrofurane were added dropwise, at −10° C, within 20 minutes, while stirring, to a solution of 240 mg of 3-oxo-4-chloro-14β-hyroxy-carda-4,20(22)-dienolide in 20 ml of absolute tetrahydrofurane, under an atmosphere of hydrogen. After stirring for 2 hours at −10° C, the reaction mixture was poured into water, the precipitate was filtered off, washed with water and dried. 270 mg of a foamy residue were obtained which were chromatographed on silica gel, the elution being effected successively with benzene (300 ml), a mixture of benzene and methylene chloride (1:1)(100 ml), methylene chloride (100 ml) and a mixture of methylene chloride and ethyl acetate (8:2)(250)ml. Upon evaporation of the last-mentioned mixture of solvents, 207 mg of 4-chloro-3β,14β-dihydroxy-carda-4,20(22)-dienolide were obtained; melting point 163°–165° C (recrystallized from a mixture of methanol and ether).

Bands in the infrared spectrum: 3,485 (shoulder), 3,390, 1,780, 1,745 (shoulder),1,730, 1,615 cm$^{-1}$.
Ultraviolet spectrum: $\lambda_{max.} = 215-217$ m$\mu$ ($\epsilon = 19,100$).

We claim:

1. 4-Chloro-3β,14β-dihydroxy-carda-4,20(22)-dienolide.
2. 4-Chlor-3-oxo-14β-hydroxy-carda-4,20(22)-dienolide.
3. The method of making 4-chloro-3-oxo-14β-hydroxy-carda-4,20(22)-dienolide which comprises chlorinating 3-oxo-carda-4,14,20(22)-trienolide with chlorine or sulfuryl chloride in the presence of an organic base selected from the group consisting of pyridine, picoline, N-dimethylaniline, quinoline, collidine, or lutidine, to form the 3-oxo-4,14,15-trichloro-carda-4,20(22)-dienolide; hydrogenating this dienolide to form 3-oxo-4-chloro-carda-4,14,20(22-trienolide; brominating this trienolide with an N-bromo-acyl amide to form 3-oxo-4-chloro-14β-hydroxy-15α-bromo-carda-4,20(22)-dienolide; and then reducing this dienolide with Raney nickel to form the desired 4-chloro-3-oxo-14β-hydroxy-carda-4,20(22)-dienolide.
4. The method as in claim 3 wherein said 4-chloro-3-oxo-14 β-hydroxyecarda-4,20(22)-dienolide is reduced with a metal hydride complex to form 4-chloro-3β,14β-dihydroxy-carda-4,20(22)-dienolide.

* * * * *